H. W. FISHER.
Water Cooler.
No. 69,200.
Patented Sept. 24, 1867.
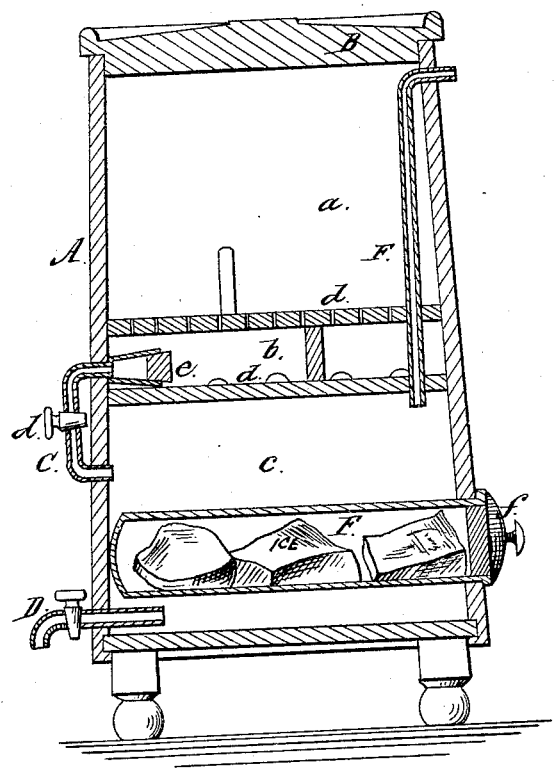
Witnesses:
Inventor:

UNITED STATES PATENT OFFICE.

H. W. FISHER, OF PHILADELPHIA, PENNSYLVANIA.

IMPROVED COOLER AND FILTERER.

Specification forming part of Letters Patent No. 69,200, dated September 24, 1867.

*To all whom it may concern:*

Be it known that I, H. W. FISHER, of Philadelphia, in the county of Philadelphia and State of Pennsylvania, have invented a new and useful Combination of a Filter and Cooler; and I do hereby declare that the following is a full, clear, and exact description thereof, which will enable others skilled in the art to make and use the same, reference being had to the accompanying drawing and the letters of reference marked thereon.

This invention consists in combining a water filter and a cooler in such a manner that a very portable device is obtained for household purposes, and one which will operate perfectly with but a moderate consumption of ice.

The accompanying drawing represents a vertical central section of my invention.

A represents the case of the device, which may be constructed of wood, earthenware, or other suitable material, and divided into three compartments, a b c, by two horizontal partitions, d d'.

The top of the case A is provided with a cover, B, and the upper partition, d, is perforated, as shown in the drawing, to allow the water to pass down from the upper compartment, a, which is the water-chamber, into the compartment b, from which it passes through a filtering medium, e, into a pipe, C, the latter conveying the filtered water into the lower compartment, c, which is provided with a faucet, D.

The pipe C is provided with a cock, d, and the lower compartment, c, is allowed to communicate with the external air by means of a tube, E, which extends up through the compartments a b, and passes out through the side of the case at the upper part of a, as clearly shown in the drawing.

F represents an ice-chamber, which extends horizontally into the lower compartment, c, and is provided with a lid, f, at its outer end.

By this arrangement it will be seen that the water is not allowed to come in direct contact with the ice, and the latter will consequently last a much longer time than when placed in the water.

The water is allowed to flow freely from c, on account of the admission of air into c, through tube E.

Having thus described my invention, I claim as new and desire to secure by Letters Patent—

The case A, formed with three compartments, a b c, and a filtering medium, e, in combination with the ice-chamber F and pipes C E, all arranged substantially in the manner as and for the purpose set forth.

The above specification of my invention signed by me this 24th day of July, 1867.

H. W. FISHER.

Witnesses:
WM. F. MCNAMARA,
J. A. SERVICE.